June 9, 1936.    R. NOTVEST    2,043,331
CONTROL FOR WELDING APPARATUS
Filed Nov. 26, 1934    2 Sheets-Sheet 1
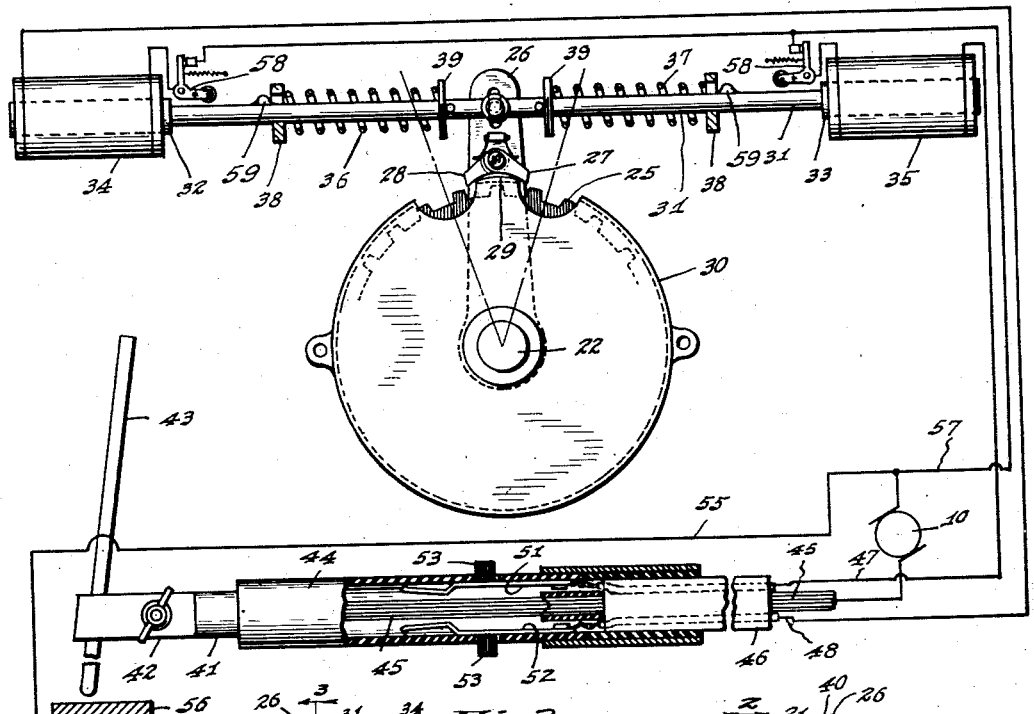
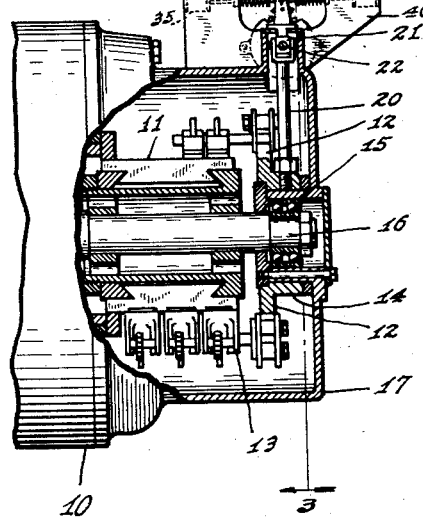
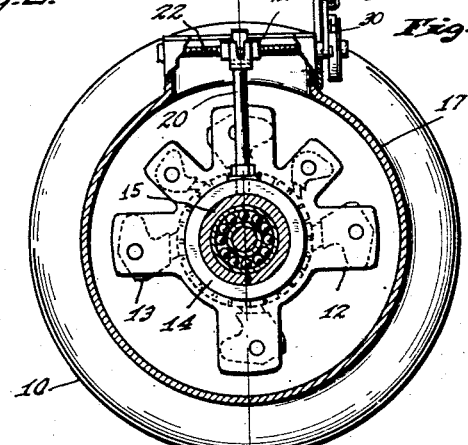
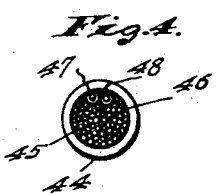
Inventor
ROBERT NOTVEST,
By
Attorneys

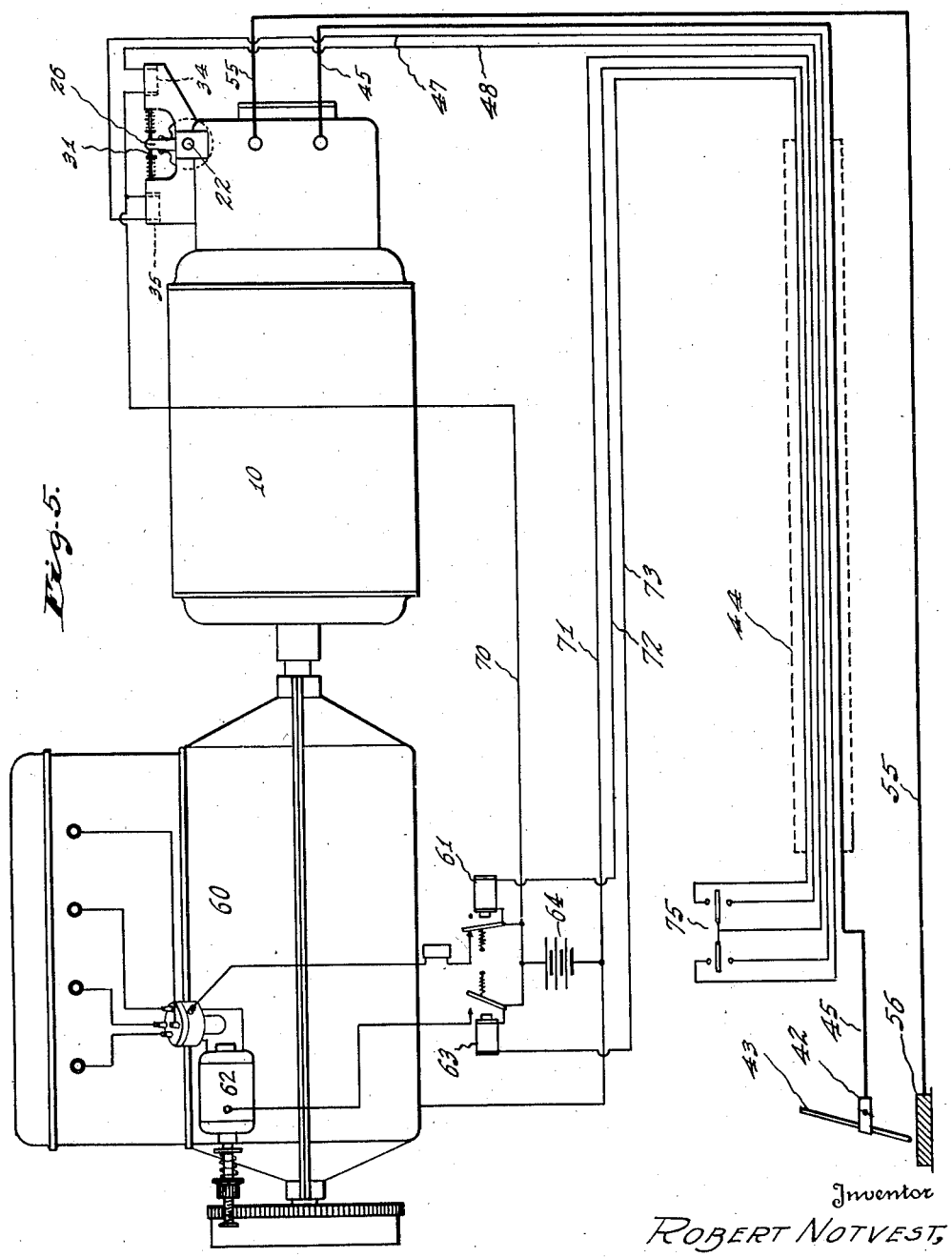

Patented June 9, 1936

2,043,331

UNITED STATES PATENT OFFICE 2,043,331

CONTROL FOR WELDING APPARATUS

Robert Notvest, Indianapolis, Ind., assignor to J. D. Adams Manufacturing Company, Indianapolis, Ind., a corporation of Indiana Application November 26, 1934, Serial No. 754,740

3 Claims. (Cl. 290—35)

In arc welding, the operator may frequently be located a considerable distance from the generator which supplies current through a flexible cable to the welding electrode that is manually guided by the operator. Most welding-current generators embody an adjustment for controlling the welding current; and not infrequently an operator at a point remote from the generator will be obliged to leave his work and adjust the generator to suit varying conditions occurring during welding. Also, a welder using an engine-driven generator and working intermittently may, in order to save engine fuel, desire to stop the engine during periods when he is not using generator current.

It is the object of my invention to enable the welder to effect generator adjustments without leaving his station, irrespective of how far that station may be removed from the generator. A further object is to secure the desired generator adjustment by a simple and positively acting means under precise control of the operator. Still another object of my invention is to provide the desired control of generator current by means which will not in any way hamper the operator in the performance of the welding operation. In the case of an engine-driven generator, it is also my object to provide means whereby the welder, without leaving his station, can control the operation of the engine.

In carrying out my invention, I provide electro-responsive means for effecting the necessary control operations such as regulation of current and/or control of engine operation and I regulate such electro-responsive means by current controlled by switches located on the electrode holder. Preferably, the wires extending between the switches on the electrode holder and the electro-responsive means at the generator are incorporated in a single cable with the conductor which supplies welding current to the electrode; and in some cases, this latter conductor may be included in one or more of the controlling circuits.

The accompanying drawings illustrate my invention: Fig. 1 is a somewhat diagrammatic view illustrating in end elevation the electro-responsive means which controls generator-adjustment and in partial section the electrode holder; Fig. 2 is a fragmental side elevation of a welding-current generator with parts thereof broken away on the line 2—2 of Fig. 3; Fig. 3 is a transverse section on the line 3—3 of Fig. 2; Fig. 4 is an end elevation of a preferred form of cable embodying the conductors which supply welding current to the electrode and control the electro-responsive means; and Fig. 5 is a diagrammatic view illustrating engine-driven welding apparatus embodying engine controls and generator controls, both of which are operated by switch means on the electrode holder.

In the arrangement illustrated in the drawings, the control of welding current is exercised by adjusting the angular disposition of the brushes of the welding-current generator. It is to be understood, however, that my invention is concerned with means for operating the mechanism which controls the operating characteristics of the generator rather than with the specific form of such mechanism itself.

The generator 10 illustrated in the drawings comprises the usual winding (not shown), a commutator 11, and a brush-holder 12 on which the brushes 13 are mounted. The brush-holder 12 is mounted for angular adjustment about the generator-axis, and to this end it may be provided with a central hub 14 which is rotatably mounted on the housing 15 enclosing the bearing which supports the adjacent end of the armature shaft 16. The housing 15 is conveniently integral or rigid with a casing 17 enclosing the commutator, brushes, and brush-holder.

For the purpose of effecting angular adjustment of the brush-holder, an arm 20 is secured to the hub 14 and extends radially therefrom, its outer end having a pin-and-slot connection with a nut 21 mounted on an adjusting screw 22 which is supported in suitable bearings in the casing 17. It will be obvious that as the screw 22 is turned the nut 21 will move along it and will swing the outer end of the arm 20 to produce the desired angular adjustment of the brush-holder 12. The construction as so far described is not novel.

In embodying my invention in a device of the type described, I mount rigidly with the screw 22 a toothed wheel 25 and co-axially with the screw 22 a swinging arm 26 carrying two oppositely directed pawls 27 and 28 for co-operation with the teeth of the wheel 25. In the normal position of the arm 26 both the pawls 27 and 28 are held out of engagement with the teeth of the wheel 25 by a shield 29 which may form part of the periphery of a circular casing 30 enclosing the wheel. The angular extent of the shield 29 is such that upon displacement of the arm 26 from its normal position the leading pawl, freed of support by the shield, will drop into engagement with the wheel 25, while the other pawl will be supported by the shield.

For the purpose of operating the arm 26 I connect it through a pin-and-slot connection to a rod 31 which extends transversely of the arm 26 and the ends of which are rigidly connected with the cores 32 and 33 of two solenoids 34 and 35 respectively. Springs 36 and 37 act oppositely on the rod 31 tending to hold it in the normal position illustrated in Fig. 1, each spring acting between a stationary abutment 38 and a suitable abutment 39 on the rod. The solenoids 34 and 35 and the abutments 38 may be supported from a base or panel 40 secured in suitable position to the casing 17.

If, in the construction described, the solenoid 35 is energized, the rod 31 will be drawn to the right and the arm 26 swung in a clockwise direction about the axis of the screw 22. As the arm 26 leaves its normal position in this clockwise movement, the pawl 27 will engage the toothed wheel 25, and thereafter the wheel will move with the arm. Upon de-energization of the solenoid 35, the spring 37 will return the arm 26 to its normal position. During the operating and return strokes of the arm 26 just described, the pawl 28 rides on the shield 29 and is thus held out of engagement with the toothed wheel 25.

Upon energization of the solenoid 34, a similar series of operations takes place, but in a reverse direction. The solenoid 34, when energized, draws the rod 31 to the left and swings the arm 26 in a counterclockwise direction. As the arm moves away from its normal position, the pawl 28 drops into engagement with the teeth of the wheel 25 to interconnect the arm and wheel. Upon de-energization of the solenoid 34, the arm 26 is returned to its normal position by the spring 36. During this series of operations, the pawl 27 rides on the shield 29 and is thereby maintained out of engagement with the teeth of the wheel 25.

For controlling operation of the solenoids 34 and 35, I employ switch means readily accessible to the welder, such switch means conveniently being mounted in the electrode holder 41. In the device illustrated in Fig. 1, the electrode holder 41 includes a clamp 42 for the electrode 43 and has a hollow handle 44 of insulating material. Current for the welding arc is supplied to the electrode through a relatively heavy conductor 45 which is incorporated in a flexible cable 46 that also includes two other conductors 47 and 48, which may be materially smaller than the conductor 45. The cable enters the rear end of the handle 44 of the electrode holder, the central conductor 45 extending forwardly through such handle to the electrode clamp 42. Switch means mounted within the handle 44 control the electrical connection of the conductor 45 with either of the conductors 47 and 48, and the circuits thus completed respectively include the solenoids 35 and 34.

The particular form of switch means illustrated in Fig. 1 comprises a pair of oppositely disposed switch members 51 and 52 which are conveniently formed of spring sheet-metal. The rear end of each of the members 51 and 52 is secured to the inner wall of the handle 44, the front ends of the switch members being free to move inwardly into engagement with the conductor 45 the insulation on which has been removed opposite the free ends of the switch members 51 and 52. To each of the switch members is affixed a button 53 of insulating material which projects laterally through an opening in the wall of the hollow handle 44. The two switch members 51 and 52 are electrically connected to the two conductors 47 and 48, respectively, in the cable 46.

One terminal of the generator 10 is connected to the conductor 45, while the other is connected through a wire 55 to the work 56 and through another wire 57 to one terminal of each of the solenoids 34 and 35. The other terminals of the solenoids 34 and 35 are connected respectively to the conductors 48 and 47 and through them to the switch members 52 and 51.

Should the operator desire to effect such a change in generator operating characteristics as is produced by clockwise rotation of the screw 22, he presses the button 53 on the switch member 51 to force the free end of such switch member into engagement with the conductor 45 and thereby completes a circuit including the generator 10, conductors 45 and 47, solenoid 35, and wire 57. The resultant energization of the solenoid 35 moves the toothed wheel 25 and screw 22 in a clockwise direction to produce the desired movement of the brush holder. Upon release of the switch member 51 it returns to its normal position against the inner face of the handle 44 where it is out of engagement with the conductor 45, the circuit through the solenoid 35 being thus opened. The resultant de-energization of the solenoid 35 permits the spring 37 to return the arm 26 to its normal position. If an adjustment of the desired extent is not effected by the operation just described, the operator again moves the switch member 51 into engagement with the conductor 45, and further rotation of the wheel 25 and screw 22 is produced. This is continued until the desired change in current is effected. Obviously, to produce a change of current in the opposite sense, the operator momentarily brings the switch member 52 into contact with the conductor 45 to energize the solenoid 34 and produce counterclockwise rotation of the adjusting screw 22, such operation being repeated as necessary to produce the desired adjustment.

To eliminate the necessity for many repeated operations of the switches 51 and 52 when relatively large adjustments of the brush holder 14 are desired, I may include in the circuit of each of the solenoids 34 and 35 a normally closed switch 58 adapted to be temporarily opened by an abutment or cam 59 on the rod 31 when that rod reaches the limit of its movement following energization of the solenoid. The parts are arranged, with due regard to their inertia and to the characteristics of the springs which bias them to their respective normal positions, so that the rod 31 may return to normal position following each temporary opening of either switch 58. With such an arrangement, closing of either switch 51 or 52 will cause intermittent energization of its associated solenoid and consequent repeated oscillations of the arm 26 between its normal position and one of its limit positions, the operator regulating the extent of the adjustment produced by controlling the length of time the switch 51 or 52 is closed.

The invention described enables the operator, from his station, to regulate the current produced by a generator which may be a considerable distance from him. The control exercised is positive and accurate. Since the conductors 47 and 48 are incorporated in a single cable with the welding-current conductor 45, the problem of keeping all conductors free from entanglement is no more difficult than it would be in the absence of my control system. Further, the use of the welding current conductor in the control circuits reduces to a minimum the number of conductors necessary to attain the desired object.

While I prefer to use current from the generator 10 to energize the solenoids 34 and 35, this is not at all essential. Neither is my invention limited to use with brush-adjusting mechanism, as it may be employed in association with other adjustable devices which control current or affect generator operation in any way.

In the apparatus illustrated in Fig. 5, the welding-current generator 10 is driven by an internal combustion engine 60. Control means such as is shown in Figs. 1 to 3 is provided for regulating generator current; and additional remote control means are provided for starting and stopping the engine.

Incorporated in the engine is any desired form of ignition system controlled by a normally closed relay 61. The engine is also provided with an electric starter-motor 62, the circuit of which includes a normally open relay 63. Current for the ignition system and for the starter-motor is supplied from a battery 64 of any convenient type.

The generator illustrated in Fig. 5, like that shown in Figs. 2 and 3 is provided with the remotely controlled current-regulating means illustrated in Figs. 1 to 3 inclusive and including the solenoids 34 and 35.

In the control circuits embodied in the apparatus shown in Fig. 5, the conductor 45 which supplies welding-current to the electrode 43 is not included, the welding circuit being entirely independent of the control circuits. One terminal of the winding of each of the relays 61 and 63 and one terminal of each of the solenoids 34 and 35 are connected by a wire 70 to one terminal of the battery 64. The opposite terminal of the battery is grounded to the frame of the engine to complete the starter-motor and ignition circuits and is also connected to a wire 71 which constitutes a common return for the four control circuits. Those ends of the two solenoids 34 and 35 which are not connected to the battery 64 are connected to wires 47 and 48, as in Figs. 1 to 3; while those terminals of the relays 61 and 63 which are not connected to the battery 64 are connected to wires 72 and 73.

The six conductors 45, 47, 48, 71, 72, and 73 are conveniently incorporated in a unitary cable extending from the generator to the electrode holder on which, as in the case of the apparatus illustrated in Figs. 1 to 3, are normally open switch means 75 for selectively closing the control circuits.

In Fig. 5, the relays 61 and 63 are shown in their normal condition, the relay 61, which controls the ignition circuit, being closed and the relay 63, which controls the starter-motor circuit, being open. The relays 61 and 63 remain in this condition while the engine is running or at rest. If the engine is running, the generator 10 produces welding current which the welder regulates as desired by operating the switch means 75 to connect either the wire 47 or the wire 48 to the common return wire 71, thus controlling the solenoids 34 and 35 as set forth above in the description of the operation of the apparatus shown in Figs. 1 and 3. When the operator desires to stop the engine he operates the switch means 75 to connect the wire 72 to the common return 71, thus completing a circuit through the battery 64 and relay 61. The resultant energization of the relay 61 opens the ignition circuit and stops the engine, the operator maintaining the relay 61 energized and the ignition circuit open until the engine has come to rest, and then the switch means 75 may be opened. To start the engine, the operator operates the switch means 75 to interconnect the wires 73 and 71, thus energizing the relay 63 and closing the circuit of the starter motor 62.

I claim as my invention:

1. In a machine for generating and controlling electric current comprising an engine, an electrical generator driven thereby, means to control the starting and stopping of the engine and means to control the adjustment of the generator voltage: the combination of a plurality of cables, one of which contains an engine starting circuit, another an engine stopping circuit, a third a generator voltage adjusting circuit, and a fourth a main generator circuit, all these cables combined in a single cable within a common insulation sleeve, a holder on the end of said single cable sleeve for supporting a main generator circuit connecting means, a main circuit generator connecting means, and switch means within said holder for selectively engaging and closing the remaining circuits.

2. In a machine for generating and controlling the quantity of electric current delivered comprising an engine, a generator driven thereby, means to start and stop the engine, and means to vary the generator voltage: the combination in a unitary cable of a main generator work circuit cable for supplying generator current having a plurality of strands and a plurality of relatively smaller control cables insulated and imbedded within the circumference of the main cable; and a common insulation sleeve enclosing all of said cables whereby the mass of the main cable and the common insulation sleeve combine to protect the smaller control cables.

3. In a machine for generating and controlling the quantity of electric current delivered comprising an engine, a generator driven thereby, means to start and stop the engine, and means to vary the generator voltage: the combination in a unitary cable of a main generator work circuit for supplying generator current having a plurality of strands forming a work circuit cable and a plurality of relatively smaller control cables insulated and imbedded within the circumference of the main cable; a common insulation sleeve enclosing all of said cables, a common insulation sleeve handle mounted on said cable at the exterior end thereof, means thereon for supporting a connecting means for the main work circuit cable, and means thereon for selectively closing the circuits carried in the smaller control cables for starting and stopping the engine and controlling the amount of generator voltage.

ROBERT NOTVEST.